US010278184B2

(12) United States Patent
Novlan et al.

(10) Patent No.: US 10,278,184 B2
(45) Date of Patent: Apr. 30, 2019

(54) RADIO RESOURCE MANAGEMENT FRAMEWORK FOR 5G OR OTHER NEXT GENERATION NETWORK

(71) Applicant: AT&T Intellectual Property I, L.P., Atlanta, GA (US)

(72) Inventors: Thomas Novlan, Austin, TX (US); Ralf Bendlin, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/674,200

(22) Filed: Aug. 10, 2017

(65) Prior Publication Data

US 2019/0053235 A1 Feb. 14, 2019

(51) Int. Cl.
| | | |
|---|---|---|
| *H04W 72/04* | (2009.01) | |
| *H04L 7/00* | (2006.01) | |
| *H04L 12/26* | (2006.01) | |
| *H04W 88/02* | (2009.01) | |
| *H04W 88/08* | (2009.01) | |

(52) U.S. Cl.
CPC ....... *H04W 72/0453* (2013.01); *H04L 7/0008* (2013.01); *H04L 43/0876* (2013.01); *H04W 88/02* (2013.01); *H04W 88/08* (2013.01)

(58) Field of Classification Search
CPC . H04W 88/02; H04W 88/08; H04W 72/0453; H04L 43/0876; H04L 7/0008
See application file for complete search history.

(56) References Cited

U.S. PATENT DOCUMENTS

| | | |
|---|---|---|
| 8,681,727 B2 | 3/2014 | Kinnunen et al. |
| 8,780,688 B2 | 7/2014 | Siomina et al. |
| 8,897,253 B2 | 11/2014 | Shin et al. |
| 9,253,777 B2 | 2/2016 | Siomina et al. |
| 9,271,281 B2 | 2/2016 | Kuo et al. |
| 9,338,781 B2 | 5/2016 | Nguyen et al. |
| 9,369,994 B2 | 6/2016 | Lee et al. |

(Continued)

FOREIGN PATENT DOCUMENTS

WO 2013140782 A1 9/2013

OTHER PUBLICATIONS

Schober, "UE-side virtual MIMO Using mm-Wave for 5G." IIS Whitepaper, 2014, 20 pages.

(Continued)

*Primary Examiner* — Thai Nguyen
(74) *Attorney, Agent, or Firm* — Amin, Turocy & Watson, LLP

(57) ABSTRACT

A radio resource measurement (RRM) and timing configuration (TC) framework can facilitate efficient configuration of RRM measurements in wireless communications systems with variable carrier and transmission bandwidths. The RMTC can comprise a list of synchronization signal (SS) block measurement and timing configurations (SMTCs) and a list of channel state information reference signal (CSI-RS) measurement and timing configurations (CMTCs). A framework is proposed to allow for efficient signaling of measurement configurations in cellular wireless communications systems with overlapping carriers of varying bandwidths comprising carriers without synchronization signals as well as bandwidth parts covering parts of the spectrum of a carrier.

20 Claims, 13 Drawing Sheets

(56) References Cited

U.S. PATENT DOCUMENTS

| | | | |
|---|---|---|---|
| 9,432,982 B2 | 8/2016 | Lee et al. | |
| 9,468,004 B2 | 10/2016 | Siomina et al. | |
| 9,474,059 B2 | 10/2016 | Seo et al. | |
| 9,485,075 B2 | 11/2016 | Xiao et al. | |
| 9,485,763 B2 | 11/2016 | You et al. | |
| 9,553,701 B2 | 1/2017 | Sadeghi et al. | |
| 9,572,142 B2 | 2/2017 | Ko et al. | |
| 9,648,657 B2 | 5/2017 | Pelletier et al. | |
| 9,699,668 B2 | 7/2017 | Park et al. | |
| 2011/0243066 A1 | 10/2011 | Nayeb Nazar et al. | |
| 2016/0007251 A1* | 1/2016 | Kazmi | H04W 24/10 455/436 |
| 2016/0020891 A1 | 1/2016 | Jung et al. | |
| 2016/0226650 A1 | 8/2016 | Chen et al. | |
| 2016/0227385 A1 | 8/2016 | Ahmad et al. | |
| 2017/0013565 A1 | 1/2017 | Pelletier et al. | |
| 2017/0117997 A1 | 4/2017 | Park et al. | |
| 2017/0126300 A1 | 5/2017 | Park et al. | |
| 2017/0164366 A1 | 6/2017 | Zeng et al. | |
| 2017/0201308 A1 | 7/2017 | Park et al. | |
| 2018/0049047 A1* | 2/2018 | Lin | H04W 24/02 |

OTHER PUBLICATIONS

Wang, et al. "Uplink multi-cluster scheduling with MU-MIMO for LTE-Advancedwith Carrier Aggregation." Wireless Communications and NetworkingConference (WCNC), IEEE, 2012, 5 pages.

Mousa, "Prospective of Fifth Generation Mobile Communications." International Journal of Next-Generation Networks (IJNGN) 4.3, 2012, 20 pages.

Chavez-Santiago, et al. "5G: The Convergence of Wireless Communications." Wireless Personal Communications 83.3, 2015, 26 pages.

International Search Report and Written Opinion dated Oct. 9, 2018 for PCT Application No. PCT/US2018/045483. 18 pages.

AT&T. "Design considerations for NR operation with wide bandwidths." 3GPP TSG RAN WG1 NR Ad-Hoc#2, Qingdao, P.R. China; Jun. 27, 2017-Jun. 30, 2017. 5 pages. URL:http://www.3gpp.org/ftp/Meetings 3GPP Sync/Rani/Docs/—[retrieved on Jun. 26, 2017].

AT&T. "RRM Measurements for Idle mode and Connected mode UE." 3GPP TSG RAN1 NR Ad Hoc Meeting Spokane, USA, Jan. 16-20, 2016. 4 pages. URL:http://www.3gpp.org/ftp/Meetings 3GPPSYNC/Rani/Docs/—[retrieved on Jan. 16, 2017].

Samsung. "RRM measurement for multiple numerologies in NR." 3GPP TSG-RAN WG2 NR Ad-hoc#2 Meeting, Dingdao, China, Jun. 27-29, 2017. 7 pages. Retrieved from the Internet: URL:http://www.3gpp.org/ftp/Meetings 3GPPSYNC/RAN2/Docs/ [retrieved on Jun. 26, 2017].

AT&T. "SS block transmissions in a wideband CC." 3GPP TSG RAN WG1 NR Ad-Hoc#2, P.R. China; Jun. 27, 2017-Jun. 30, 2017. 2 pages. http://www.3gpp.org/FTP/tsg_ran/WG1_RL1/TSGR1_AH/NR_AH_1706/Docs/.

* cited by examiner

```
-- ASN1START

MeasObjectToAddMod ::=     SEQUENCE {
    measObjectId                        MeasObjectId,
    measObject                          CHOICE {
        MeasObjectNR                        MeasObjectNR,
        ...,
    }
}

MeasObjectNR ::=                        SEQUENCE {
    carrierFreq                         ARFCN-ValueNR,
    presenceSsBlock                     PresenceSsblock,
    -- SMTC list
    smtcToRemoveList                    SmtcIndexList               OPTIONAL,       -- Need ON
    smtcToAddModList                    CellsToAddModList           OPTIONAL,       -- Need ON -- CMTC list
    cmtcToRemoveList                    CmtcIndexList               OPTIONAL,       -- Need ON
    cmtcToAddModList                    CmtcToAddModList            OPTIONAL,       -- Need ON
    ...,
}

SmtcToAddModList ::=                    SEQUENCE (SIZE (1..maxSmtcMeas)) OF SmtcsToAddMod CmtcToAddModList ::=                    SEQUENCE (SIZE (1..maxCmtcMeas)) OF CmtcToAddMod SmtcsToAddMod ::=    SEQUENCE {
    ssBlockNumerology                   ENUMERATED {n15, n30, n120, n240},
    ssBlockFreqLocationOffset           ENUMERATED {},
    ssBlockPattern                      ENUMERATED {pattern0, pattern1},
    ssBlockPeriodicity                  ENUMERATED {ms5, ms10, ms20, ms40, ms80, ms160, spare,
                                            spare},
    ssBlockOffset                       INTEGER (1..ssBlockPeriodicity),
    ssBlockTransmissionIndication       BIT STRING (SIZE (maxNumSS-Block)), bandWidthPartIndex                  INTEGER (1..maxNumBandwidthparts),
    CellsToAddModList ::=               SEQUENCE (SIZE (1..maxCellMeas)) OF CellsToAddMod
    CellsToAddMod ::=    SEQUENCE {
        cellIndex                           INTEGER (1..maxCellMeas),
        physCellId                          PhysCellId,
    }
    BlackCellsToAddModList ::=          SEQUENCE (SIZE (1..maxCellMeas)) OF BlackCellsToAddMod
    BlackCellsToAddMod ::=    SEQUENCE {
        cellIndex                           INTEGER (1..maxCellMeas),
        physCellIdRange                     PhysCellIdRange
    }
    ...,
}

CmtcToAddMod::= SEQUENCE {
    csi-ConfigIndex                     INTEGER (0..maxNumCsiConfig),
    bandwidthPartIndex                  INTEGER (1..maxNumBandwidthParts),
    ssBlockForQcl                       CHOICE {
        bandWidthPartIndexForQcl            INTEGER (1..maxNumBandwidthparts),
        measObjectId                        INTEGER (1..maxObjectId)
    }
    CellsToAddModList ::=               SEQUENCE (SIZE (1..maxCellMeas)) OF CellsToAddMod
    CellsToAddMod ::=    SEQUENCE {
        cellIndex                           INTEGER (1..maxCellMeas),
        physCellId                          PhysCellId,
    }
    BlackCellsToAddModList ::=          SEQUENCE (SIZE (1..maxCellMeas)) OF BlackCellsToAddMod
    BlackCellsToAddMod ::=    SEQUENCE {
        cellIndex                           INTEGER (1..maxCellMeas),
        physCellIdRange                     PhysCellIdRange
    }
    ...,
}

-- ASN1STOP
```

FIG. 5

```
-- ASN1START

MeasObjectToAddMod ::=    SEQUENCE {
    measObjectId                       MeasObjectId,
    measObject                         CHOICE {
        MeasObjectNR                       MeasObjectNR,
        ...,
    }
}

MeasObjectNR ::=                       SEQUENCE {
    carrierFreq                        ARFCN-ValueNR,
    rsToMeasure                        ENUMERATED {smtc, cmtc, smtcAndCmtc, spare},
    -- SMTC list
    smtcToRemoveList                   SmtcIndexList                OPTIONAL,   -- Need ON
    smtcToAddModList                   SmtcsToAddModList            OPTIONAL,   -- Need ON
    -- CMTC list
    cmtcToRemoveList                   CmtcIndexList                OPTIONAL,   -- Need ON
    cmtcToAddModList                   CmtcToAddModList             OPTIONAL,   -- Need ON
    ...,
}

SmtcsToAddModList ::=                  SEQUENCE (SIZE (1..maxSmtcMeas)) OF SmtcsToAddMod CmtcsToAddModList ::=                  SEQUENCE (SIZE (1..maxCmtcMeas)) OF CmtcsToAddMod SmtcsToAddMod ::=    SEQUENCE {
    ssBlockNumerology                  ENUMERATED {n15, n30, n120, n240},
    ssBlockFreqLocationOffset          ENUMERATED {}
    ssBlockPattern                     ENUMERATED {pattern0, pattern1},
    ssBlockPeriodicity                 ENUMERATED {
                                       xms5, ms10, ms20, ms40, ms80, ms160, spare,
                                           spare},
    ssBlockOffset                      INTEGER (1..ssBlockPeriodicity),
    ssBlockTransmissionIndication      BIT STRING (SIZE (maxNumSS-Block)),
    bandWidthPartIndex                 INTEGER (1..maxNumBandwidthparts),
    csiForQcl::=                       SEQUENCE (SIZE (1.. maxNumCsiConfig)) OF csi-ConfigIndex
                                       CHOICE {
        bandWidthPartIndexForQcl           INTEGER (1..maxNumBandwidthparts),
        measObjectId                       INTEGER (1..maxObjectId)
    },
    CellsToAddModList ::=              SEQUENCE (SIZE (1..maxCellMeas)) OF CellsToAddMod
    CellsToAddMod ::=     SEQUENCE {
        cellIndex                          INTEGER (1..maxCellMeas),
        physCellId                         PhysCellId,
    }
    BlackCellsToAddModList ::=         SEQUENCE (SIZE (1..maxCellMeas)) OF BlackCellsToAddMod
    BlackCellsToAddMod ::=  SEQUENCE {
        cellIndex                          INTEGER (1..maxCellMeas),
        physCellIdRange                    PhysCellIdRange
    }
    ...,
}

CmtcToAddMod::= SEQUENCE {
    csi-ConfigIndex                    INTEGER (0..maxNumCsiConfig),
    bandwidthPartIndex                 INTEGER (1..maxNumBandwidthParts),
    CellsToAddModList ::=              SEQUENCE (SIZE (1..maxCellMeas)) OF CellsToAddMod
    CellsToAddMod ::=     SEQUENCE {
        cellIndex                          INTEGER (1..maxCellMeas),
        physCellId                         PhysCellId,
    }
    BlackCellsToAddModList ::=         SEQUENCE (SIZE (1..maxCellMeas)) OF BlackCellsToAddMod
    BlackCellsToAddMod ::=  SEQUENCE {
        cellIndex                          INTEGER (1..maxCellMeas),
        physCellIdRange                    PhysCellIdRange
    }
    ...,
}
...,
}

-- ASN1STOP
```

FIG. 6

```
-- ASN1START

MeasObjectToAddMod ::=    SEQUENCE {
    measObjectId              MeasObjectId,
    measObject                CHOICE {
        MeasObjectNR              MeasObjectNR,
        ...,
    }
}

MeasObjectNR ::=              SEQUENCE {
    carrierFreq               ARFCN-ValueNR,
    presenceSsBlock           PresenceSsBlock,
    -- Rmtc list
    rmtcsToRemoveList         RmtcsIndexList
    -- Cell list
    cellsToRemoveList         CellIndexList            OPTIONAL,    -- Need ON
    cellsToAddModList         CellsToAddModList        OPTIONAL,    -- Need ON
    -- Black list
    blackCellsToRemoveList    CellIndexList            OPTIONAL,    -- Need ON
    blackCellsToAddModList    BlackCellsToAddModList   OPTIONAL,    -- Need ON
    ...,
}
CellsToAddModList ::=         SEQUENCE (SIZE (1..maxCellMeas)) OF CellsToAddMod CellsToAddMod ::=   SEQUENCE {
    cellIndex                 INTEGER (1..maxCellMeas),
    physCellId                PhysCellId,
}

BlackCellsToAddModList ::=    SEQUENCE (SIZE (1..maxCellMeas)) OF BlackCellsToAddMod BlackCellsToAddMod ::=  SEQUENCE {
    cellIndex                 INTEGER (1..maxCellMeas),
    physCellIdRange           PhysCellIdRange
}

RmtcToAddModList ::=    SEQUENCE {
    bandWidthPartIndex        INTEGER (1..maxNumBandwidthparts),
    rsToMeasure               ENUMERATED {smtc, cmtc, smtcAndCmtc, spare},
    -- SMTC list
    smtcToRemoveList          SmtcIndexList            OPTIONAL,    -- Need ON
    smtcToAddModList          SmtcsToAddModList        OPTIONAL,    -- Need ON
    -- CMTC list
    cmtcToRemoveList          CmtcIndexList            OPTIONAL,    -- Need ON
    cmtcToAddModList          CmtcToAddModList         OPTIONAL,    -- Need ON
    ...,
}

SmtcsToAddMod ::=   SEQUENCE {
    ssBlockNumerology         ENUMERATED {n15, n30, n120, n240},
    ssBlockFreqLocationOffset ENUMERATED {}
    ssBlockPattern            ENUMERATED {pattern0, pattern1},
    ssBlockPeriodicity        ENUMERATED {ms5, ms10, ms20, ms40, ms80, ms160, spare,
                                  spare},
    ssBlockOffset             INTEGER (1..ssBlockPeriodicity},
    ssBlockTransmissionIndication  BIT STRING (SIZE (maxNumSS-Block)},
    ...,
}

CmtcToAddMod::= SEQUENCE {
    csi-ConfigIndex           INTEGER (0..maxNumCsiConfig),
    ssBlockForQcl             CHOICE {
        bandWidthPartIndexForQcl  INTEGER (1..maxNumBandwidthparts),
        measObjectId              INTEGER (1..maxObjectId)
    }
    ...,
}
...,
}

-- ASN1STOP
```

FIG. 7

```
-- ASN1START

MeasResults ::=                         SEQUENCE {
    measId                                  MeasId,
    measResultPCell                         measResultListBandwidthPartPCell,
    measResultNeighCells                    CHOICE {
        measResultListNR                        MeasResultListNR,
        ...
    }
    ...,
} measResultListBandwidthPartPCell ::=    SEQUENCE (SIZE (1..maxNumBandwidthPart)) OF
                                                measResultBandwidthPartPCell measResultBandwidthPartPCell ::=        SEQUENCE {
    rsrpResult                              RSRP-Range
    rsrqResult                              RSRQ-Range              OPTIONAL,
    rs-sinr-Result                          RS-SINR-Range           OPTIONAL,
    MeasResultCSI-RS-List                   MeasResultCSI-RS-List   OPTIONAL,
    ...,
} measResultListNR::=         SEQUENCE (SIZE (1..maxCellReport)) OF MeasResultNR

MeasResultNR ::=    SEQUENCE {
    physCellId                  PhysCellId,
    measResult                  measResult
}

MeasResultServFreqList ::=  SEQUENCE (SIZE (1..maxServCell)) OF MeasResultServFreq MeasResultServFreq ::=          SEQUENCE {
    servFreqId                      ServCellIndex,
    measResultSCell                 measResultListBandwidthPartSCell        OPTIONAL,
    measResultBestNeighCell         measResultBestNeighCell OPTIONAL,
    ...,
} measResultListBandwidthPartSCell ::=    SEQUENCE (SIZE (1..maxNumBandwidthPart)) OF
                                                measResultBandwidthPartSCell
measResultListBandwidthPartSCell ::=        SEQUENCE {
    rsrpResult                              RSRP-Range
    rsrqResult                              RSRQ-Range              OPTIONAL,
    rs-sinr-Result                          RS-SINR-Range           OPTIONAL,
    MeasResultCSI-RS-List                   MeasResultCSI-RS-List   OPTIONAL,
    ...,
}

MeasResultCSI-RS-List ::=   SEQUENCE (SIZE (1..maxCellReport)) OF MeasResultCSI-RS MeasResultCSI-RS ::=    SEQUENCE {
    measCSI-RS-Id               MeasCSI-RS-Id,
    csi-RSRP-Result             CSI-RSRP-Range,
    ...
}

-- ASN1STOP
```

FIG. 8

RADIO RESOURCE MANAGEMENT FRAMEWORK FOR 5G OR OTHER NEXT GENERATION NETWORK

TECHNICAL FIELD

This disclosure relates generally to facilitating radio resource management. For example, this disclosure relates to facilitating signaling of measurement configurations in wireless communications systems with overlapping carriers of varying bandwidths for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to radio resource management is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 5 illustrates example table information elements according to one or more embodiments.

FIG. 6 illustrates other example table information elements according to one or more embodiments.

FIG. 7 illustrates yet other example table information elements according to one or more embodiments.

FIG. 8 illustrates another example table representative of measurement quality metrics according to one or more embodiments.

DETAILED DESCRIPTION

Figure 1:
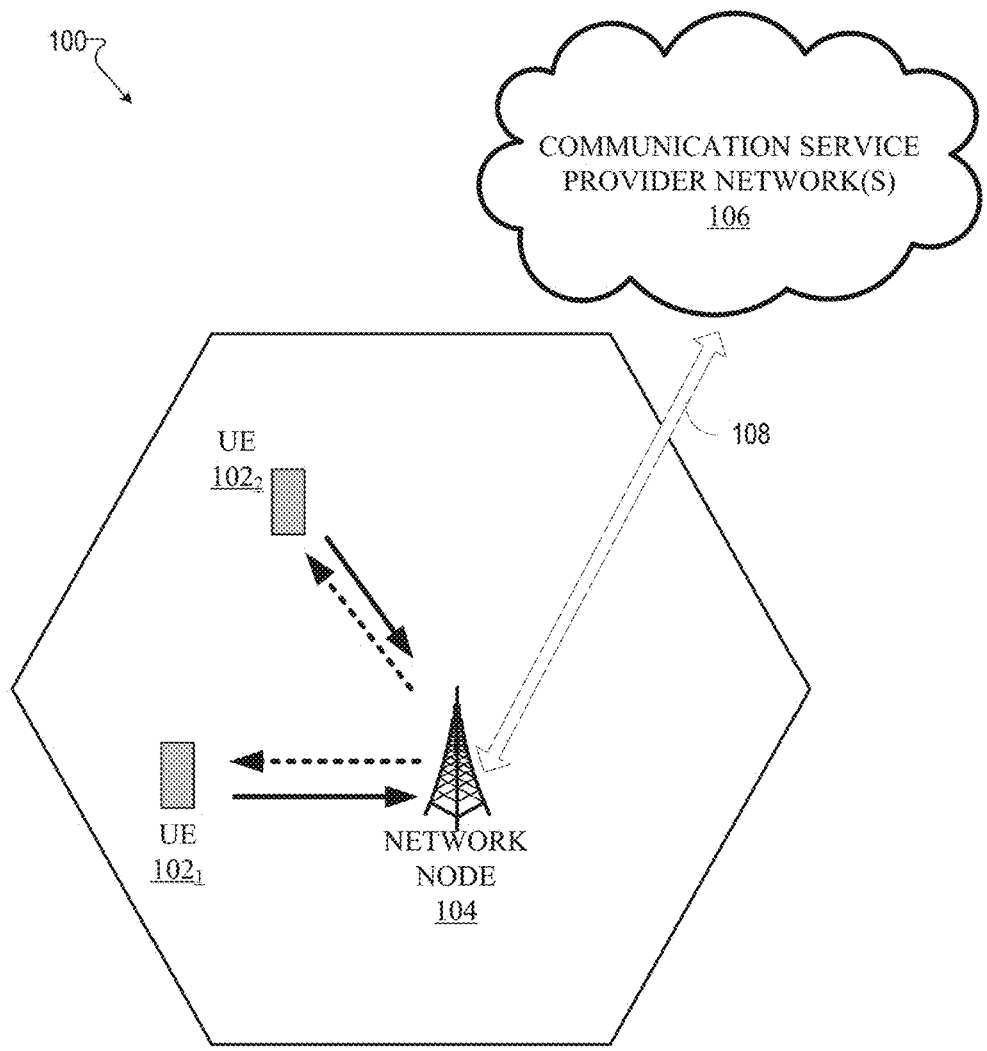
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate radio resource management for a 5G network or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate a radio resource management framework for a 5G network. Facilitating a radio resource management framework for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

NR carriers can be configured with and with synchronization and broadcast signals or channels, much unlike LTE. In addition, and also unlike LTE, NR supports user equipment (UE) capable of operating in a subset of the specified carrier bandwidths. More precisely, in LTE all UEs are mandated to support the aforementioned system bandwidths of 1.4 MHz, 3 MHz, 5 MHz, 10 MHz, 15 MHz, 20 MHz. While a base station or evolved NodeB or (eNodeB or eNB) can use an analog frond end spanning a 40 MHz radio frequency (RF) bandwidth, LTE requires the carrier aggregation (CA) framework to make use of such large bandwidths by configuring two carriers of 20 MHz each that are then aggregated as a primary component carrier (PCC) and a secondary component carrier (SCC). Thus, LTE does not specify a system bandwidth of 40 MHz.

In the NR air interface, a network can operate with a large bandwidth, say 40 MHz in the above example, without requiring UEs to support the same carrier bandwidth. In other words, in the example above, some UEs can attach to a cell associated with said carrier using a 40 MHz bandwidth whereas other UEs can attach to the same cell on the same carrier using a much smaller (e.g., 20 MHz) bandwidth.

Moreover, NR allows for configuration of "zero-guard" component carriers (CCs) whereas LTE does not support CCs without a guard. Other differences between NR and previous generation orthogonal frequency-division multiple access (OFDMA) wireless communications systems comprise that NR modulates the direct current (DC) subcarrier (0 Hertz) whereas LTE does not modulate it. Consequently, NR can place the DC within the transmission bandwidth of a wideband carrier.

A RRM measurement and timing configuration (RMTC) framework can efficiently configure RRM measurements in wireless communications systems with variable carrier and transmission bandwidths. The RMTC can comprise a list of synchronization signal (SS) block measurement and timing configurations (SMTCs) and a list of channel state information reference signal (CSI-RS) measurement and timing configurations (CMTCs), whereby empty lists are not precluded. The names RMTC, SMTC, and CMTC or the SS and CSI-RS signals are not intended, however, to be construed in a limiting sense and simply serve for illustration of the invention. A SMTC and CMTC can contain all parameters required at the user equipment to perform measurements using SS blocks and CSI-RS, respectively. In particular, each SMTC/CMTC in the lists thereof that are comprised in an RMTC can be associated with a BWP. For CSI-RS, a quasi-colocation (QCL) assumption (e.g., for timing reference) can be signaled to the UE. In some embodiments, the QCL assumption is part of the CMTC. In that case, the list of SMTCs can be empty. Alternatively, an SMTC can signal for which CSI-RS or CMTC it serves as a QCL reference. In some embodiments, the SMTC/CMTC can encode whether the UE shall perform RRM measurements using only SS blocks, only CSI-RS or CSI-RS as well as SS block transmissions. In other embodiments, the UE can be signaled whether to perform RRM measurements using only SS blocks, only CSI-RS, or CSI-RS and SS block transmissions outside the SMTCs/CMTCs, namely, in the RMTC. Each RMTC can be associated with a carrier frequency, (e.g., a NR absolute radio-frequency channel number (NARFCN)). The RMTC can contain a list of sequences or identifiers (IDs) of network cells for which the UE shall report quality measurements such as a reference signal received power (RSRP), a received signal strength indicator (RSSI), a reference signal received quality (RSRQ), and/or a signal-to-interference ratio (SIR). Alternatively, when no sequences or IDs are provided to the UE as part of the RMTC, the UE can detect sequences or IDs autonomously and report either, only the sequences/IDs or the sequences/IDs and a quality measure. Moreover, whereas carriers are addressed via a NARFCN, BWPs can be addressed via physical resource block (PRB) indices or resource block group (RBG) indices. In addition, when signaling the QCL assumption for a CSI-RS, this can be explicit (e.g., using a carrier/BWP index) or implicit. For the latter, the QCL of a CSI-RS can be signaled as the SMTC with the lowest index in the list of SMTCs. If a carrier does not have SS block transmissions, the QCL assumption can also be given by an RMTC with a different NARFCN. In addition, the measurement reports comprising SS Blocks and/or CSI-RS can be provided per RMTC, or per SMTC/CMTC, or per BWP.

The RMTC can be provided to a UE for the purpose of configuring RRM measurements, which can be based on SS blocks and/or CSI-RS. The RRM measurements can include quality measures/measurements such as the RSRP, the RSSI, the RSRQ or the SIR. The RMTC can be provided via UE-specific signaling (e.g., RRC) per carrier frequency (e.g. a "NR Absolute radio-frequency channel number" (NAR-FCN)) and can provide measurement configurations for one or more BWPs. The RMTC can comprise the following parameters: NARFCN, to add or remove the SMTC, to add/remove the CMTC.

An SMTC and CMTC can comprise all the parameters required at the UE to perform measurements using SS blocks and CSI-RS. The SMTC and CMTC can contain a list of sequences or IDs for which the UE shall report or alternatively a list or range of sequences or IDs for which the UE shall not report (e.g., black list). Alternatively, when no sequences or IDs are provided to the UE as part of the SMTC or CMTC, the UE can detect sequences or IDs autonomously and report either only the sequences/IDs or the sequences/IDs and a quality measure. In one example, the SMTC can provide the following parameters: SS block numerology, SS block frequency location (e.g. absolute location or relative offset from the carrier center frequency), SS block pattern, SS burst set periodicity and offset, indication of transmitted SS blocks within a SS burst set (pattern or list of SS Block time indices), list(s) of cells for performing measurements (e.g. sequences or physical cell IDs (PCI)), and/or an association between CSI-RS for RRM measurement and SS block (e.g. QCL assumption). For idle-mode and inter-frequency measurements, a single measurement periodicity can be provided per SMTC, however for intra-frequency measurements up to two measurement periodicities can be configured along with associated measurement (cell) IDs.

In another example, the CMTC can provide the following parameters: CSI-RS numerology, CSI-RS measurement bandwidth and frequency location (e.g., absolute location or relative offset from the carrier center frequency), CSI-RS pattern, CSI-RS periodicity, CSI-RS total transmission bandwidth, Parameters for CSI-RS sequence generation, list of cells for performing measurements (e.g., sequences or physical cell IDs (PCI)), and/or an association between the CSI-RS for the RRM measurement and the SS block (e.g., QCL assumption).

According to an embodiment, a method can comprise receiving configuration data related to a measurement and timing applicable to a radio resource of a wireless network, wherein the configuration data comprises a carrier frequency and bandwidth data representative of a bandwidth associated with the wireless network. Based on the configuration data, the method can also comprise, configuring the radio resource in accordance with the carrier frequency and the bandwidth data.

According to another embodiment, a system can facilitate, transmitting bandwidth data associated with a network device of a wireless network to configure a radio resource of a mobile device. Based on the bandwidth data, the system can facilitate configuring the radio resource of the mobile device in accordance with a frequency of signals received by the network device. Furthermore, in response to the facilitating the configuring, the system can receive data associated with an identification of a cell of the wireless network.

According to yet another embodiment, described herein is a machine-readable storage medium that can perform the operations comprising sending configuration data related to a measurement and timing applicable to a radio resource of a wireless network, wherein the configuration data comprises carrier frequency data representative of a carrier frequency and bandwidth partition data representative of a bandwidth partition. Additionally, in response to the sending the configuration data, the machine-readable storage medium that can perform the operations comprising facilitating configuring the radio resource in accordance with the carrier frequency data and the bandwidth partition data.

These and other embodiments or implementations are described in more detail below with reference to the drawings.

FIG. 1 illustrates an example wireless communication system 100 in accordance with various aspects and embodiments of the subject disclosure. In example embodiments, the wireless communication system is or comprises a wireless communication network serviced by one or more wireless communication network providers. In example embodiments, the wireless communication system can comprise one or more user equipment (UEs) 102 (e.g., 102$_1$, 102$_2$ . . . 102$n$), which can comprise one or more antenna panels comprising vertical and horizontal elements. A UE 102 can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. UE 102 can also comprise IOT devices that can communicate wirelessly. UE 102 roughly corresponds to the mobile station (MS) in global system for mobile communications (GSM) systems. Thus, the network node 104 (e.g., network node device) can provide connectivity between the UE and the wider cellular network and can facilitate wireless communication between the UE and the wireless communication network (e.g., the one or more communication service provider networks 106, described in more detail below) via a network node 104. The UE 102 can send and/or receive communication data wirelessly to the network node 104. The dashed arrow lines from the network node 104 to the UE 102 represent downlink (DL) communications and the solid arrow lines from the UE 102 to the network nodes 104 represent uplink (UL) communications.

The non-limiting term network node (e.g., network node device) can be used herein to refer to any type of network node serving a UE 102 and/or connected to other network nodes, network elements, or another network node from which the UE 102 can receive a radio signal. In typical cellular radio access networks (e.g., universal mobile telecommunications system (UMTS) networks), they can be referred to as base transceiver stations (BTS), radio base station, radio network nodes, base stations, NodeB, eNodeB (e.g., evolved NodeB), etc.). In 5G terminology, the node can be referred to as a gNodeB (e.g., gNB) device. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

The wireless communication system can further comprise one or more communication service provider networks 106 that facilitate providing wireless communication services to various UEs, comprising UE 102, via the network node 104 and/or various additional network devices (not shown) included in the one or more communication service provider networks 106. The one or more communication service provider networks 106 can include various types of disparate networks, comprising: cellular networks, femto networks, picocell networks, microcell networks, internet protocol (IP) networks Wi-Fi service networks, broadband service network, enterprise networks, cloud based networks, and the like. For example, in at least one implementation, the wireless communication system can be or can comprise a large scale wireless communication network that spans various geographic areas. According to this implementation, the one or more communication service provider networks 106 can be or can comprise the wireless communication network and/or various additional devices and components of the wireless communication network (e.g., additional network devices and cells, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

In one technique, the UE 102 can send a reference signal back to the network node 104. The network node 104 takes a received reference signal from the UE 102, estimates the condition of the channel, which can be influenced by various factors, such as objects in the line of sight, weather, movement, interference, etc., and after correcting for more issues (e.g., interference), adjusts the beamforming rates for each antenna transmitting to the UE 102, and changes parameters, so as to transmit a better beam toward the UE 102. This ability to select MIMO schemes and use beamforming to focus energy and adapt to changing channel conditions can allow for higher data rates.

Figure 2:
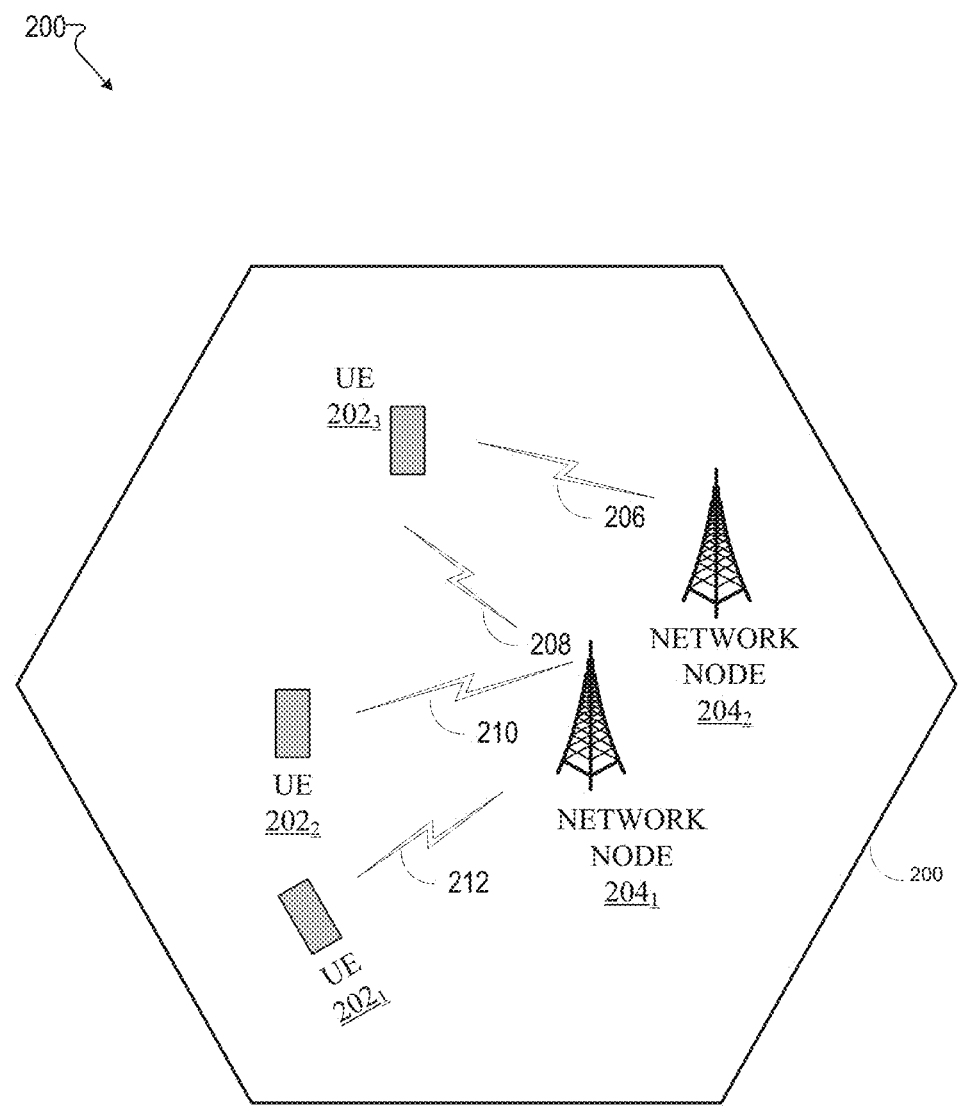
FIG. 2 illustrates an example schematic system block diagram of an example wireless communication system for radio resource management according to one or more embodiments.

Referring now to FIG. 2, illustrated is an example schematic system block diagram of an example wireless communication system 200 for radio resource management according to one or more embodiments. User equipment $202_1$, $202_2$, $202_3$ are connected to base station $204_1$, $204_2$ via communications links 212, 210, 208, 206 respectively. Example wireless communication system 200 is not intended to be construed in a limiting sense and may comprise a plurality of the base stations $204_1$, $204_2$ and a plurality of UE $202_1$, $202_2$, $202_3$ connected to the base stations or a subset thereof via a plurality of communications links 212, 210, 208, 206. In particular, UE $202_1$, $202_2$, $202_3$ can connect to a plurality of base stations $204_1$, $204_2$ via a plurality of communications links 212, 210, 208, 206 whereby for a given UE, (e.g., UE $202_3$) each communications link, (e.g., 206, 208) is associated with a given carrier frequency or bandwidth part. Moreover, the UE $202_3$ that is connected to the base station $204_1$ via the communications link 208 can also measure other communications links to different base stations to which it may or may not be connected. For example, the UE $202_3$ can receive a primary synchronization signal (PSS) and secondary synchronization signal (SSS) from the base station $204_1$. After the UE $202_3$ has performed time/frequency synchronization using the PSS/SSS transmissions by the base station $204_1$, the UE $202_3$ can select an optimal transmit/receive beam pair and decode the physical broadcast channel (PBCH) transmitted by the base station $204_1$. After decoding the master information block (MIB) transmitted on the PBCH, the UE $202_3$ can then decode other system information (SI) before it initiates a random access procedure by sending a preamble on the physical random access channel (PRACH). After reception of said PRACH by the base station $204_1$, the base station $204_1$ can transmit a random access response (RAR) on a physical downlink control channel (PDCCH) and associated physical downlink shared channel (PDSCH), which includes but is not limited to an uplink grant for a physical uplink shared channel (PUSCH) transmission. If required, the network can perform a contention resolution procedure, otherwise, a radio resource control (RRC) connection setup can be performed. Once the RRC connection setup has been completed, the UE $202_3$ can be in RRC_CONNECTED mode and can now transmit and receive data from/to the communication system 200. The UE $202_3$ can also be in RRC_IDLE mode whereby it has registered to the communication system 200 and can be reached by the communication system 200 via a paging message sent by one or more base stations $204_1$, $204_2$ of the radio access communication system 200. For the purpose of radio resource management (RRM), the UEs $202_1$, $202_2$, $202_3$ in the communication system 200 can perform RRM measurements. The UEs $202_1$, $202_2$, $202_3$ in RRC_IDLE mode can perform RRM measurements autonomously, however, the communication system 200 can provide assistance information to assist the UEs $202_1$, $202_2$, $202_3$ in performing the RRM measurements. The RRM measurements in RRC_CONNECTED mode can be under the control of one or more base stations $204_1$, $204_2$ to which the UE $202_3$ is connected. RRM measurements can also be distinguished between intra-frequency and inter-frequency measurements.

Figure 3:
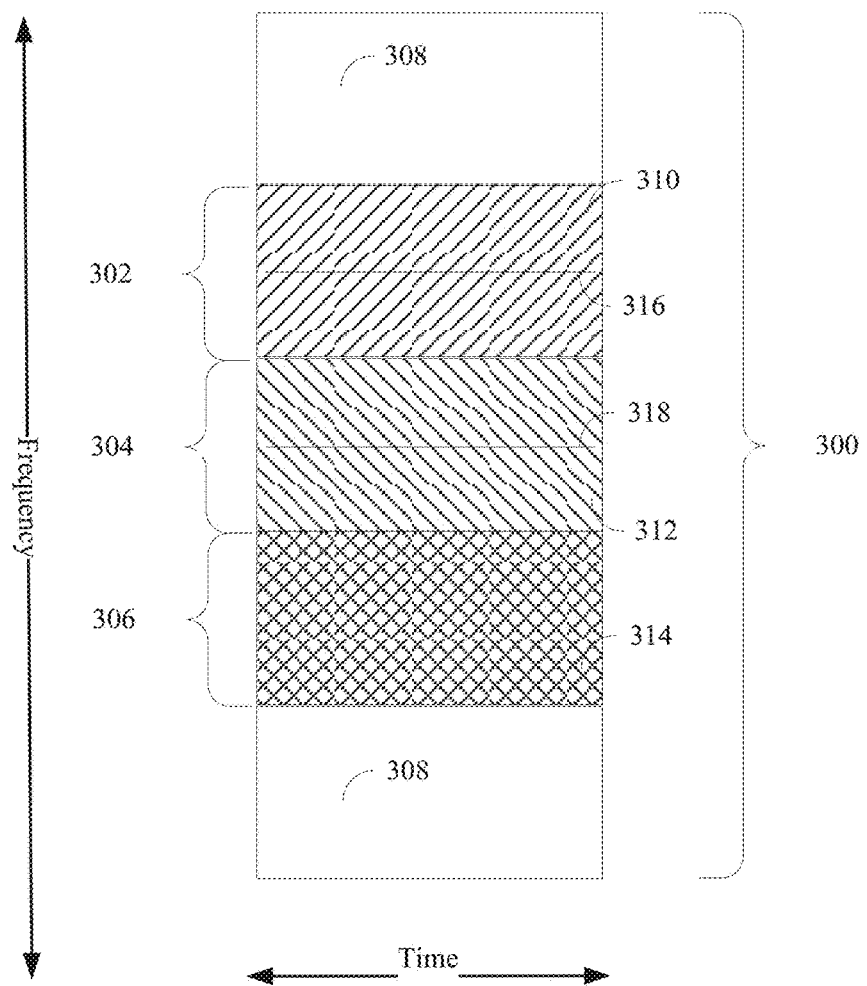
FIG. 3 illustrates an example schematic system block diagram of another example wireless communication system for radio resource management according to one or more embodiments.

Referring now to FIG. 3, illustrated is an example schematic system block diagram of another example wireless communication system for radio resource management according to one or more embodiments. The UE $202_3$ can be configured for carrier 310 of bandwidth 302, the UE $202_2$ can be configured with carrier 312 of bandwidth 304, and the UE $202_1$ can be configured with carrier 308 of bandwidth 300. For instance, UE $202_3$ and $202_2$ may only support small bandwidths 302 and 304, whereas the UE $202_1$ supports a large bandwidth 300. Even though the UE $202_1$ supports a large bandwidth 300, it can be configured with a bandwidth part (e.g., partition) 306 that is much smaller than the bandwidth 300.

The carrier 310 of the bandwidth 302 can have a center frequency 316, the carrier 312 of the bandwidth 304 can have a center frequency 318, and the carrier 308 of the bandwidth 300 can have a center frequency 318. PSS/SSS/PBCH transmissions may or may not be centered on center frequencies 316, 318. Moreover, the bandwidth partition 306 for the carrier 314 may or may not have PSS/SSS/PBCH transmissions, and the BWP 306 is not assumed to have PSS/SSS/PBCH transmissions. In addition, carriers may or may not have PSS/SSS/PBCH transmissions. For example, the carriers 310, 312 may or may not have PSS/SSS/PBCH transmissions.

In addition to PSS/SSS/PBCH transmissions, channel state information reference signals (CSI-RS) can be configured for the carriers 310, 312, 308 and/or the BWP 306. CSI-RS is not intended to be construed in a limiting sense. The UEs $202_1$, $202_2$, $202_3$ can perform RRM measurements using PSS/SSS/PBCH transmissions and/or CSI-RS transmissions depending on their configurations. More precisely, a UE can be instructed to perform RRM measurements per carrier and/or BWP and said instructions can include per carrier/BPW whether to use PSS/SSS/PBCH transmissions, CSI-RS transmissions, or both. RRM measurements within the same carrier are generally referred to as intra-frequency measurements whereas RRM measurements in a different carrier are generally referred to as inter-frequency measurements. Note, however, that such a categorization is not intended to be construed in a limiting sense, particularly, since narrowband carriers 310, 312, 314 can partially or fully overlap with the wideband carrier 308 and since the narrowband BWP 306 can be configured within the wideband carrier 308.

As noted previously, the communication system 200 can assist the UEs $202_1$, $202_2$, $202_3$ in the RRM measurement procedures. For example, the base station $204_1$ can instruct the UEs $202_1$, $202_2$, $202_3$ to report PSS/SSS/PBCH transmissions on a given carrier/BWP (e.g., by reporting an identification (ID) such as a physical cell ID (PCI)) associated with each PSS/SSS/PBCH transmission. In addition to reporting the ID, the UE can also report a quality measure associated with the ID (e.g., the reference signal received power (RSRP), the received signal strength indicator (RSSI), the reference signal received quality (RSRQ), and/or the signal-to-interference ratio (SIR)). Alternatively, or in addition, the base station $204_1$ can instruct the UEs $202_1$, $202_2$, $202_3$ to report aforementioned quality measures for a list of IDs associated with PSS/SSS/PBCH transmission that is provided to the UEs $202_1$, $202_2$, $202_3$ as part of the measurement configuration. Alternatively or in addition, the base station $204_1$ can also instruct the UEs $202_1$, $202_2$, $202_3$ to report different quality measures associated with reference signals (RS) other than PSS/SSS, such as CSI-RS. For example, the base station $204_1$ can include a list of IDs and/or a list of RS configurations as part of the measurement configuration and the UEs $202_1$, $202_2$, $202_3$ can report a quality measure for each RS configuration according to the RS configuration. More precisely, the measurement configurations which can include RS configurations can be associated with carriers and/or BWPs, thereby enabling inter-frequency and intra-frequency measurements. The PSS/SSS/RS transmissions used by the UEs $202_1$, $202_2$, $202_3$ for the purpose of RRM measurements can be transmitted by a UE's serving cell. For instance, the base station $204_1$ or a UE's neighboring cell, such as the base station $204_1$. The UE in RRC_IDLE mode or the base station $204_1$ when the UE is in RRC_CONNECTED mode, can use these RRM measurements to select the best cell to camp on (RRC_IDLE mode) or to be connected to (RRC_CONNECTED mode).

Figure 4:
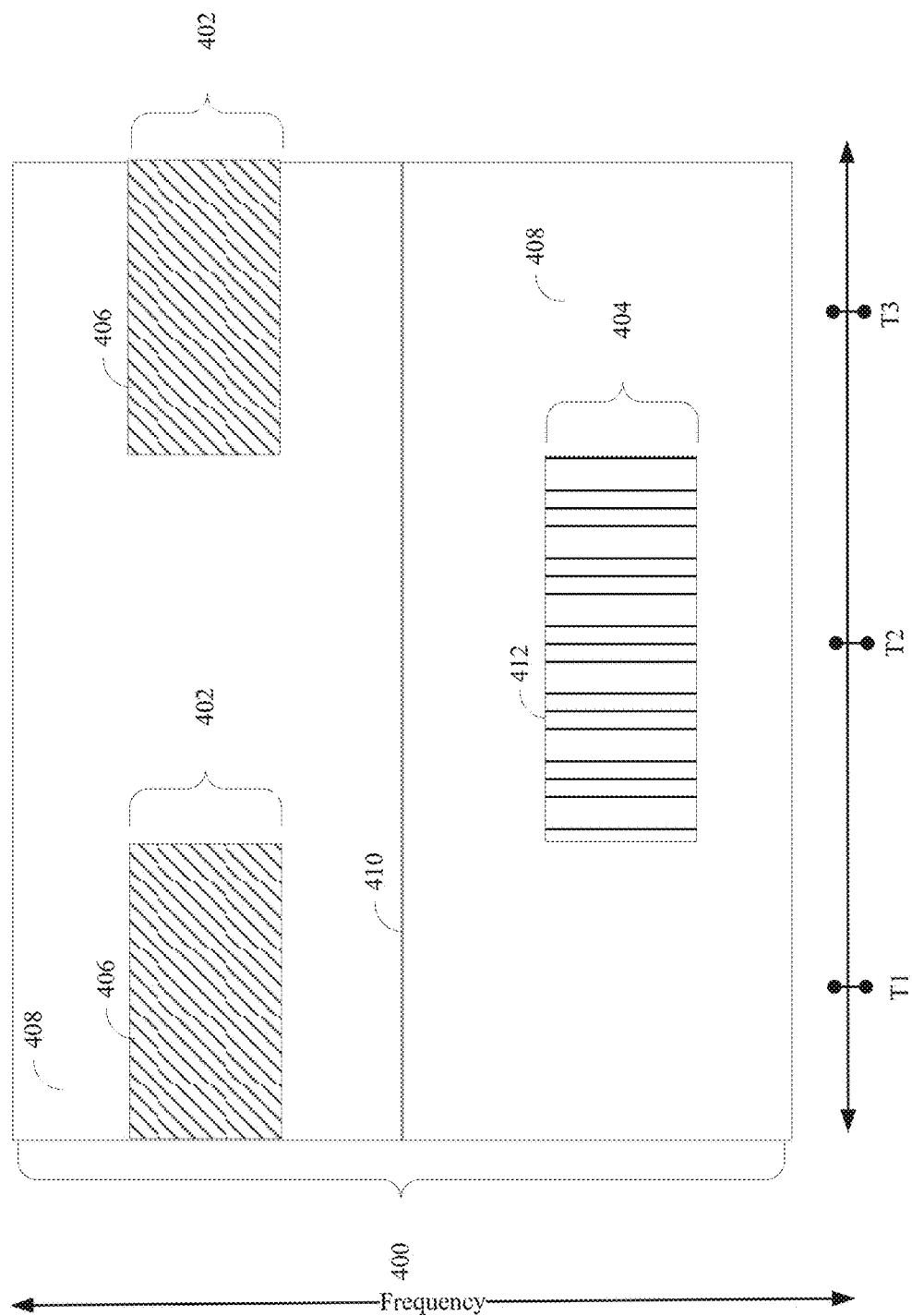
FIG. 4 illustrates an example schematic system block diagram wherein multiple bandwidth partitions are associated with a carrier according to one or more embodiments.

Referring now to FIG. 4, illustrated is an example schematic system block diagram wherein multiple bandwidth partitions are associated with a carrier according to one or more embodiments. Multiple BWPs can be configured for the UEs $202_1$, $202_2$, $202_3$, however only one BWP can be active at a given instance. As illustrated in FIG. 4, represents a bandwidth 408 for a carrier 400, small bandwidths 402, 404 for carriers 406 and 412, respectively, and center frequency 410. For a UE, an active BWP is a BWP for which the UE monitors for PDCCH/PDSCH and performs RRM/CSI measurements. For an inactive part, the UE is not expected to receive PDCCH/PDSCH and can perform RRM/CSI measurements, although potentially with a different measurement and reporting configuration (e.g., periodicity). In one alternative, during T2 the BWP 402 can be active and the BWP 404 can be inactive. Even though the BWP 402 is active, the UE is not expected to receive PDCCH/PDSCH on the BWP 404 during T2. In a second alternative, during T2 the BWP 402 can be inactive and the BWP 404 can be active. Even though the BWP 404 is active, the UE is not expected to receive PDCCH/PDSCH on the BWP 404 during T2.

The measurement behavior for a given active or inactive BWP can be fixed in the specification or can be configured as part of the RMTC. In one example a BWP measurement pattern can be configured per carrier or BWP, which comprises a measurement periodicity and duration (e.g., 160 ms and 5 ms respectively). In another example, the measurement pattern can be derived from the RMTC/SMTC/CMTC (e.g., 2× or 5× the measurement RS periodicity). In addition the measurement pattern can comprise a time/frequency hopping pattern across on or more BWPs (e.g., all configured BWPs or a subset of configured BWPs).

In yet another embodiment, the measurement pattern can be determined based on a priority, which can be explicitly indicated to the UE in an RMTC/SMTC/CMTC or can be indicated implicitly by the index of the BWP (e.g., the lowest index has the highest priority). Alternatively, the UE can determine an appropriate measurement pattern autonomously, subject to overall measurement performance requirements (e.g., measurement within a given time period such as 200 ms). For example, the UE can determine which BWPs to measure during a measurement gap (e.g., T2 in FIG. 4) based on one or more factors such as the time since it previously made a measurement of a given BWP, energy saving criteria, or RF capabilities.

In yet another embodiment, the UE can only perform measurements of BWPs, which are part of an activated SCell or for intra-frequency measurements. Otherwise, a UE can only perform measurement of a default BWP (if configured) or SS blocks when the SCell is deactivated, for inter-frequency measurement, or if the UE is in IDLE mode.

Referring now to FIGS. 5-8, illustrated are example table elements according to one or more embodiments. FIG. 5 illustrates the association between the CSI-RS for RRM measurements wherein the SS block can comprise a QCL assumption (e.g., for timing reference) to be signaled to the UE. In some embodiments, the QCL assumption can be a part of the CMTC as shown in FIG. 5 by the information element ssBlockforQcl. In that case, the association may be an index to one or more SMTCs of an RMTC. Alternatively, an SMTC can signal for which CSI-RS or CMTCs it serves as QCL reference e.g., using a carrier/BWP index, or implicitly. For the former, for example in FIG. 6, the information element csiForQcl in the SMTC provides the association. For the latter, for example, the QCL of a CSI-RS can be signaled as the SMTC with the lowest index in the list of SMTCs. Note that CMTC can be associated with a different NARFCN than the SMTC, e.g. the CSI-RS can be transmitted on the same or different carrier. In yet another alternative the association is provided separately in a RMTC. For example if a carrier does not have SS block transmissions, the QCL assumption can also be given by an RMTC with a different NARFCN. In addition, each BWP can be independently associated with a QCL assumption. In another example, a QCL assumption can be associated per RMTC or frequency carrier.

In another embodiment, each SMTC/CMTC indicated by the RMTC are associated with a bandwidth part (BWP). Each RMTC can be associated with an NARFCN. Moreover, whereas carriers can be addressed via an NARFCN, BWPs can be addressed via physical resource block (PRB) indices or resource block group (RBG) indices. In one alternative, the BWP indications can be independently provided per SMTC/CMTC as part of the SMTC/CMTC information element, for example as shown in FIGS. 5 and 6 by the bandwidthPartIndex information elements.

In another alternative embodiment, the BWP indication can be provided by the RMTC and the SMTC/CMTC association with a given BWP is provided jointly by the BWP configuration information element in the RMTC as shown in FIG. 7. In addition, the list of cells to add, remove, or blacklist can also be provided by the RMTC (or NR measurement object) and applied to all SMTCs/CMTCs as shown in FIG. 7.

In some embodiments, the SMTC/CMTC indicates whether the UE shall perform RRM measurements using only SS blocks, only CSI-RS, or CSI-RS and SS block transmissions. The UE can be configured with carriers/BWPs, which do not contain SS block transmissions or alternatively carriers/BWPs with SS blocks. However the UE is not expected to perform measurements of SS block transmissions on the indicated carrier. In addition, the UE can be configured to measure CSI-RS on the same or different BWPs. In one example, the expected SS block measurement behavior is explicitly indicated to the UE by a ssBlockPresence parameter which is set per carrier frequency as part of a carrier configuration message (e.g., SCell configuration) or measurement configuration (e.g., measurement object/RMTC) as shown in FIG. 5. In another example the UE can be implicitly informed about the expected SS block measurement behavior for a given carrier by the presence, or lack of presence, of any SMTC information element in the corresponding RMTC as shown in FIG. 7 using the information element rsToMeasure.

In yet another embodiment, the UE can transmit a measurement report containing measurement quality metrics (e.g., RSRP/RSRQ/SINR) for each SMTC/CMTC periodically on the basis of one or more measurement report triggers or criteria as shown in FIG. 8. The UE can provide a measurement report per BWP or set of BWPs, which can contain SS block measurements, CSI-RS-based measurements, or both types of measurements. In another alternative, the UE can provide a measurement report per RMTC or carrier frequency, and in yet another example, the UE can provide both PCell and SCell BWP measurements in a single measurement result.

Figure 9:
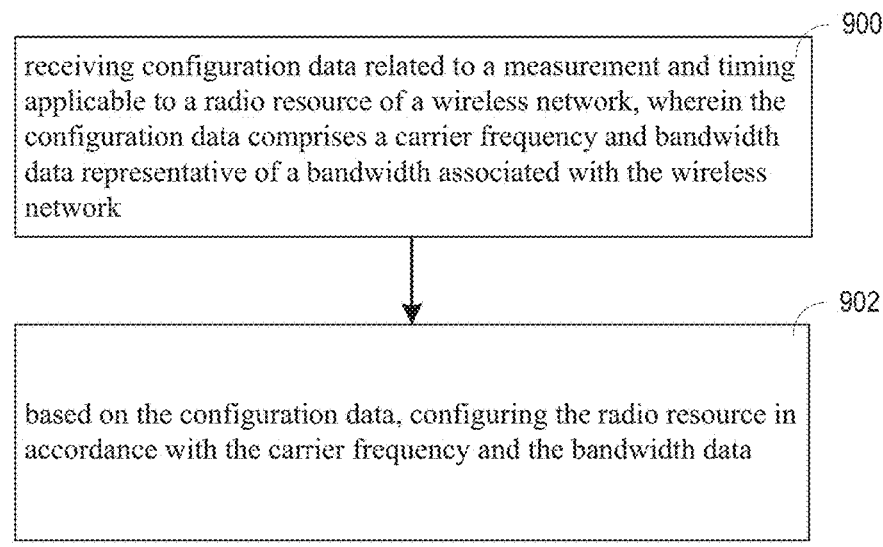
FIG. 9 illustrates an example flow diagram for radio resource measurement for a 5G network according to one or more embodiments.

Referring now to FIG. 9, illustrates an example flow diagram for radio resource measurement for a 5G network according to one or more embodiments. At element 900, a method can comprise receiving (e.g., via UE 202) configuration data related to a measurement and timing applicable to a radio resource of a wireless network, wherein the configuration data comprises a carrier frequency and bandwidth data representative of a bandwidth associated with the wireless network. At element 902, based on the configuration data, the method can comprise configuring (e.g., via UE 202) the radio resource in accordance with the carrier frequency and the bandwidth data.

Figure 10:
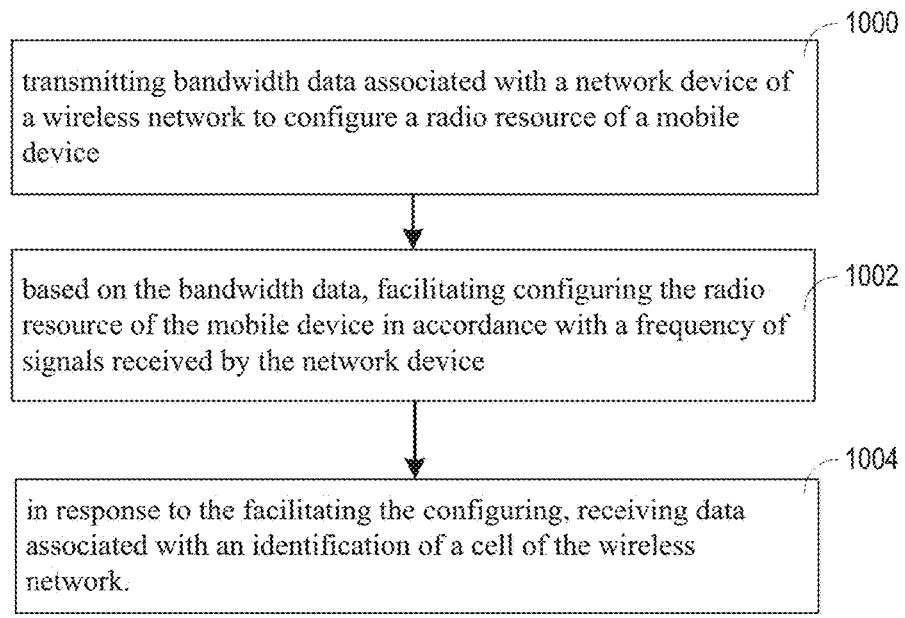
FIG. 10 illustrates another example flow diagram for radio resource measurement for a 5G network according to one or more embodiments.

Referring now to FIG. 10, illustrated is another example flow diagram for radio resource measurement for a 5G network according to one or more embodiments. At element 1000, the system can transmit (e.g., via the base station 204) bandwidth data associated with a network device of a wireless network (e.g., communication system 200) to configure a radio resource of a mobile device (e.g., 202). At element 1002, based on the bandwidth data, the system can facilitate configuring the radio resource of the mobile device in accordance with a frequency of signals received by the network device (e.g., the base station 204), and in response to the facilitating the configuring, the system can receive (e.g., via 204) data associated with an identification of a cell of the wireless network at element 1004.

Figure 11:
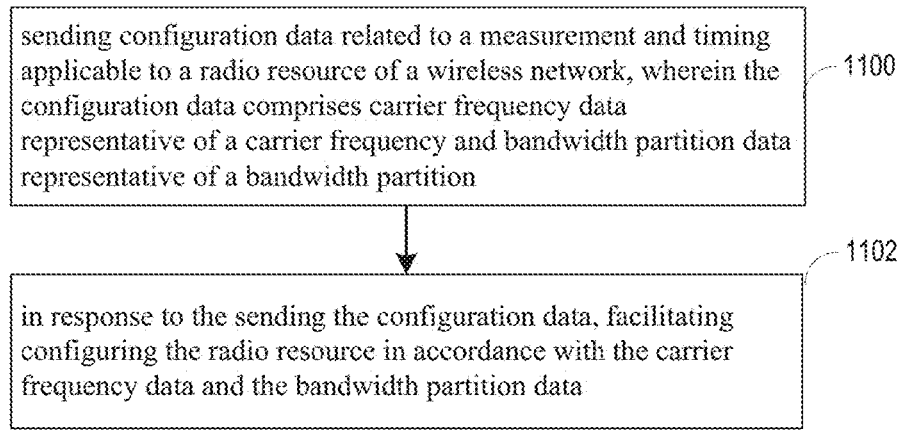
FIG. 11 illustrates yet another example flow diagram for radio resource measurement for a 5G network according to one or more embodiments.

Referring now to FIG. 11, illustrated is yet another example flow diagram for radio resource measurement for a 5G network according to one or more embodiments. At element 1100, the machine-readable medium can facilitate sending (e.g., via the base station 204) configuration data related to a measurement and timing applicable to a radio resource of a wireless network (e.g., communication system 200), wherein the configuration data comprises carrier frequency data representative of a carrier frequency and bandwidth partition data representative of a bandwidth partition. At element 1102, in response to the sending the configuration data (e.g., via the base station 204), the machine-readable medium can facilitate configuring the radio resource in accordance with the carrier frequency data and the bandwidth partition data.

Figure 12:
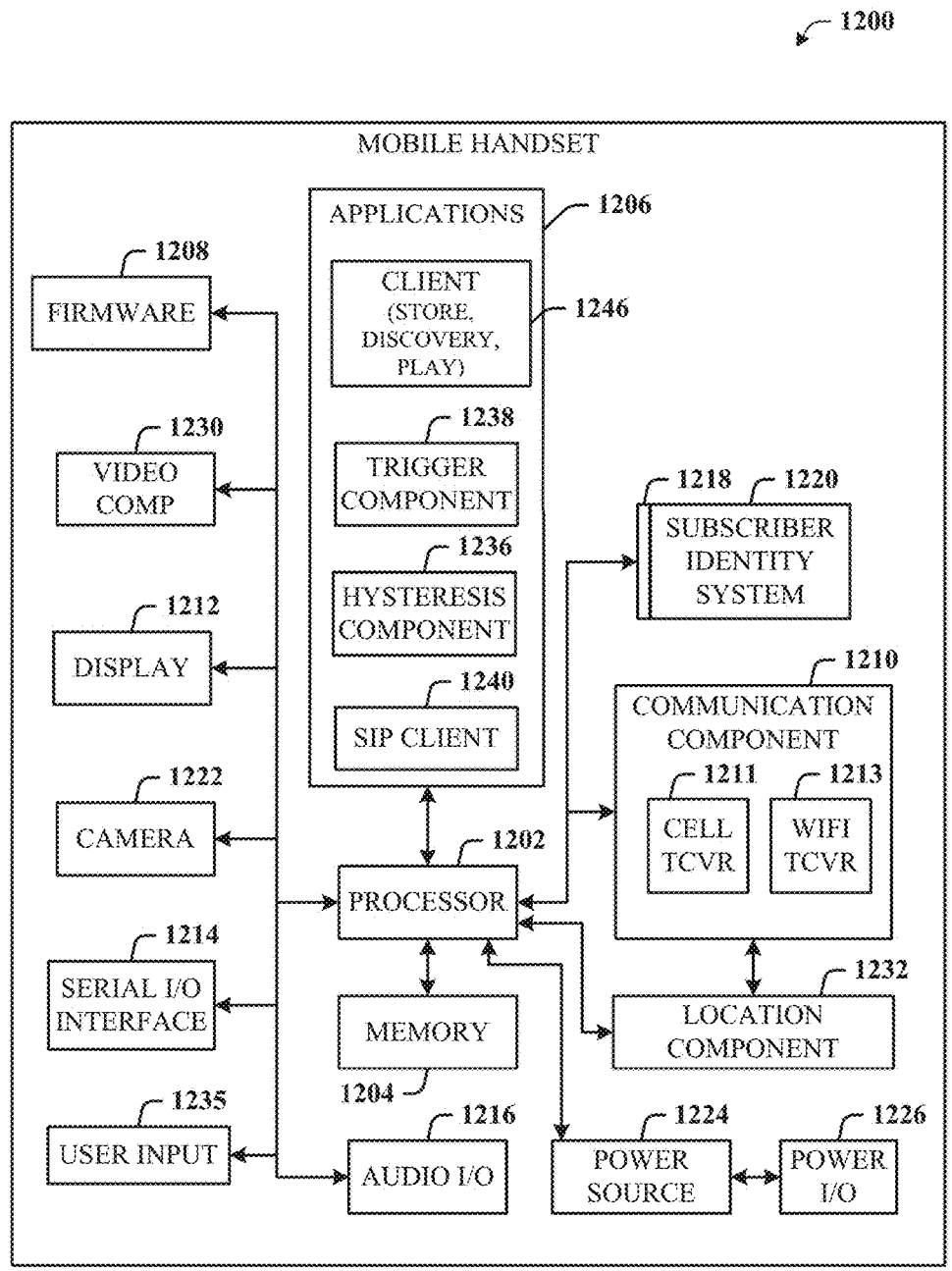
FIG. 12 illustrates an example block diagram of an example mobile handset operable to engage in a system architecture that facilitates secure wireless communication according to one or more embodiments described herein.

Referring now to FIG. 12, illustrated is a schematic block diagram of an exemplary end-user device such as a mobile device 1200 capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment 1200 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communication component 1210 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 810, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
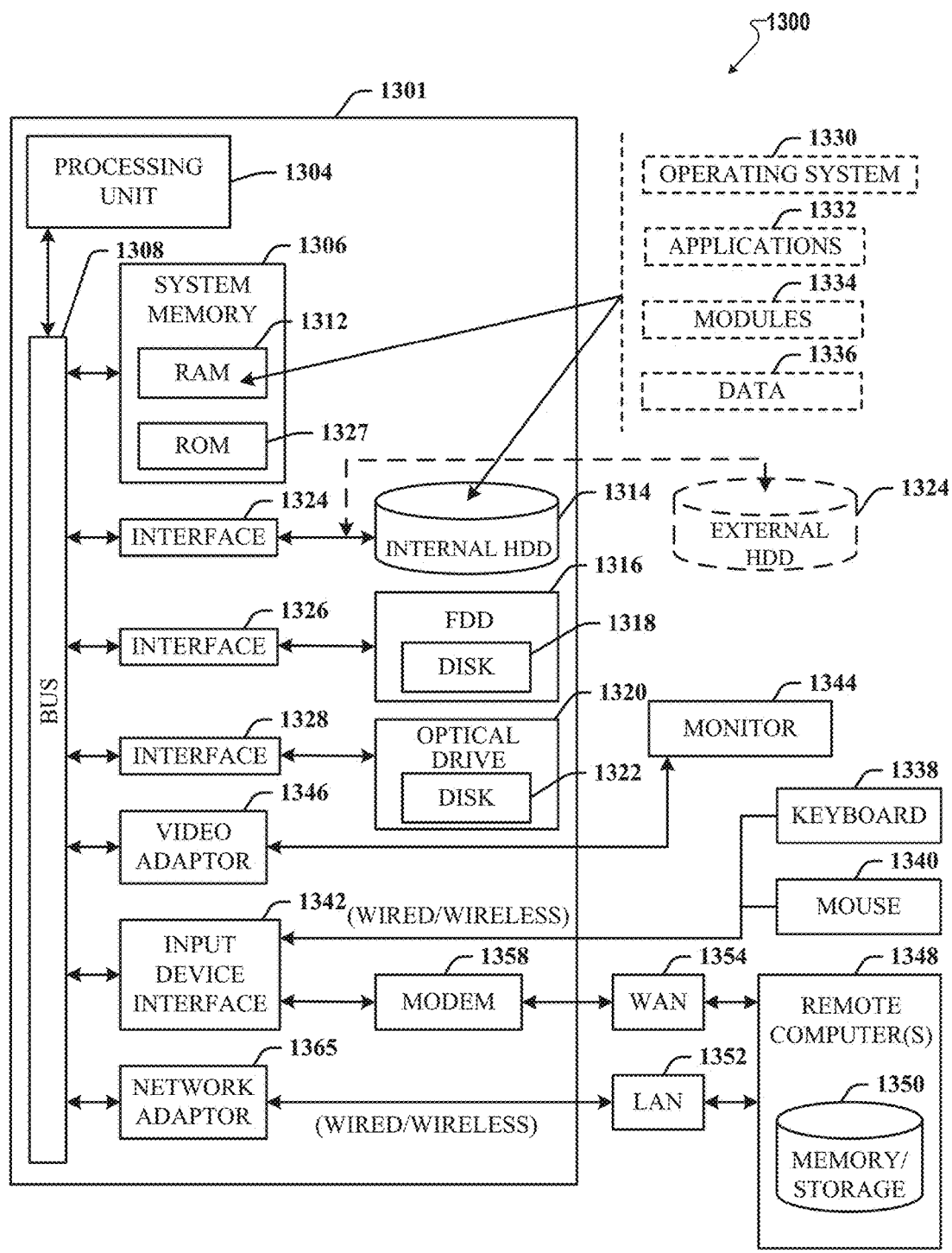
FIG. 13 illustrates an example block diagram of an example computer operable to engage in a system architecture that facilitates secure wireless communication according to one or more embodiments described herein.

Referring now to FIG. 13, there is illustrated a block diagram of a computer 1300 operable to execute a system architecture that facilitates establishing a transaction between an entity and a third party. The computer 1300 can provide networking and communication capabilities between a wired or wireless communication network and a server (e.g., Microsoft server) and/or communication device. In order to provide additional context for various aspects thereof, FIG. 13 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 13, implementing various aspects described herein with regards to the end-user device can include a computer 1300, the computer 1300 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1327 and random access memory (RAM) 1312. A basic input/output system (BIOS) is stored in a non-volatile memory 1327 such as ROM, EPROM, EEPROM, which BIOS contains the basic routines that help to transfer information between elements within the computer 1300, such as during start-up. The RAM 1312 can also include a high-speed RAM such as static RAM for caching data.

The computer 1300 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1300 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1300, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the innovation can be implemented with various commercially available operating systems or combinations of operating systems.

A user can enter commands and information into the computer 1300 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 2394 serial port, a game port, a USB port, an IR interface, etc.

A monitor 1344 or other type of display device is also connected to the system bus 1308 through an interface, such as a video adapter 1346. In addition to the monitor 1344, a computer 1300 typically includes other peripheral output devices (not shown), such as speakers, printers, etc.

The computer 1300 can operate in a networked environment using logical connections by wired and/or wireless communications to one or more remote computers, such as a remote computer(s) 1348. The remote computer(s) 1348 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1300 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1300 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the input device interface 1342. In a networked environment, program modules depicted relative to the computer, or portions thereof, can be stored in the remote memory/storage device 1350. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

NR supports configurable bandwidth parts BWPs. BWPs can be configured within a (wideband) carrier to enable energy savings at the UE in periods of low load. More precisely, a UE supporting a wide carrier bandwidth (e.g., 1 GHz) can be configured with a much smaller BWP (e.g., 50 MHz) thereby allowing the UE to reduce its RF frond end from 1 GHz to 50 MHz. The reduced RF transmission bandwidth can reduce UE power consumption and can prolong UE battery life. These novelties of the NR air interface lend to a new and optimized radio resource management (RRM) and measurement framework, as previously, BWPs have not been defined and carriers of different bandwidth did not coexist in overlapping manners.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a mobile device comprising a processor, configuration data related to a measurement and timing applicable to a radio resource of a wireless network, wherein the configuration data comprises a carrier frequency and bandwidth data representative of a bandwidth associated with the wireless network, and wherein the configuration data comprises quasi-colocation data representative of a relationship between a channel state data reference signal and a synchronization signal block;
   based on the quasi-colocation data, reporting, by the mobile device, a sequence identification associated with the wireless network; and
   based on the configuration data, configuring, by the mobile device, a transceiver of the mobile device to receive the radio resource in accordance with the carrier frequency and the bandwidth data.

2. The method of claim 1, wherein the configuration data is utilized to configure a synchronization signal used to synchronize a frequency used for communication between the mobile device and the wireless network.

3. The method of claim 2, wherein the configuration data comprises instruction data representative of an instruction to associate a configuration of the synchronization signal with the carrier frequency and the bandwidth data.

4. The method of claim 1 wherein the configuration data is utilized to configure the channel state data reference signal used by the mobile device in connection with determining channel state data applicable to a communication channel used by the mobile device to communicate via the wireless network.

5. The method of claim 1, further comprising:
configuring, by the mobile device, received quality measurement data representative of a power associated with a reference signal used by a network device of the wireless network.

6. The method of claim 1, further comprising:
configuring, by the mobile device, received quality measurement data representative of a reference signal quality associated with a network device of the wireless network.

7. The method of claim 1, wherein the receiving comprises receiving the configuration data via a radio resource control message associated with the mobile device.

8. The method of claim 1, wherein the configuration data comprises instruction data representative of an instruction to associate a configuration of the channel state data reference signal with the carrier frequency and the bandwidth data.

9. A non-transitory machine-readable storage medium, comprising executable instructions that, when executed by a processor, facilitate performance of operations, comprising:
sending configuration data related to a measurement and timing applicable to a radio resource of a wireless network, wherein the configuration data comprises carrier frequency data representative of a carrier frequency and bandwidth partition data representative of a bandwidth partition, and wherein the configuration data comprises quasi-colocation data representative of a relationship between a reference signal and a synchronization signal block;
based on the quasi-colocation data, receiving, from a mobile device of the wireless network, sequence identification data representative of a sequence identification; and
in response to the sending the configuration data, facilitating configuring a transceiver of the mobile device to receive the radio resource in accordance with the carrier frequency data and the bandwidth partition data.

10. The non-transitory machine-readable storage medium of claim 9, wherein the configuration data comprises synchronization signal configuration data representative of a configuration of a synchronization signal to be received by the mobile device.

11. The non-transitory machine-readable storage medium of claim 10, wherein the synchronization signal configuration data comprises an indication that the synchronization signal block has been transmitted.

12. The non-transitory machine-readable storage medium of claim 9, wherein the configuration data comprises channel state data associated with a reference signal configuration usable to configure the reference signal.

13. The non-transitory machine-readable storage medium of claim 12, wherein the channel state data comprises frequency data representative of a frequency of a signal of a mobile device, and wherein the frequency is offset from the carrier frequency.

14. The non-transitory machine-readable storage medium of claim 9, wherein the configuration data comprises transmission bandwidth data associated with a transmission bandwidth of the wireless network.

15. A system, comprising:
a processor; and
a memory that stores executable instructions that, when executed by the processor, facilitate performance of operations, comprising:
receiving configuration data related to a measurement and timing applicable to a radio resource of a wireless network, wherein the configuration data comprises a carrier frequency and bandwidth data representative of a bandwidth associated with the wireless network, and wherein the configuration data comprises quasi-colocation data representative of a relationship between a channel state data reference signal and a synchronization signal block;
based on the quasi-colocation data, reporting a sequence identification associated with the wireless network; and
based on the configuration data, configuring a transceiver of a mobile device to receive the radio resource in accordance with the carrier frequency and the bandwidth data.

16. The system of claim 15, wherein the operations further comprise:
receiving an indication of a reduced utilization of the radio resource from a first utilization to a second utilization, lower than the first utilization, from the mobile device.

17. The system of claim 15, wherein the bandwidth data comprises channel state data associated with a resource signal for use in the configuring of the transceiver.

18. The system of claim 15, wherein the bandwidth data comprises a synchronization signal for use in the configuring of the transceiver.

19. The system of claim 18, wherein the operations further comprise:
in response to a condition associated with the synchronization signal being determined to have been satisfied, receiving identification data associated with an identification of a cell of the wireless network from the mobile device.

20. The system of claim 19, wherein the receiving the identification data comprises receiving quality measurement data representative of a signal quality of a signal received from the mobile device.

* * * * *